US010540512B2

(12) United States Patent
Gschwind et al.

(10) Patent No.: US 10,540,512 B2
(45) Date of Patent: Jan. 21, 2020

(54) EXCEPTION PRESERVING PARALLEL DATA PROCESSING OF STRING AND UNSTRUCTURED TEXT

(71) Applicant: International Business Machines Corporation, Armonk, NY (US)

(72) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 238 days.

(21) Appl. No.: 14/869,181

(22) Filed: Sep. 29, 2015

(65) Prior Publication Data

US 2017/0091124 A1   Mar. 30, 2017

(51) Int. Cl.
*G06F 9/30* (2018.01)
*G06F 15/80* (2006.01)
(Continued)

(52) U.S. Cl.
CPC ........ *G06F 21/6227* (2013.01); *G06F 16/316* (2019.01); *G06F 9/30032* (2013.01);
(Continued)

(58) Field of Classification Search
CPC ............. G06F 12/1441; G06F 21/6227; G06F 12/1483; G06F 9/30018; G06F 2207/025; G06F 2212/1052; G06F 2221/2141; G06F 2221/2145; G06F 15/8053; G06F 15/8076; G06F 15/8084; G06F 9/30032; G06F 9/30036; G06F 9/30043; G06F 9/3017; G06F 3/468; G06F 11/3636; G06F 11/3648; G06F 12/1416; G06F 12/1458; G06F 16/30; G06F 16/31; G06F 16/313;
(Continued)

(56) References Cited

U.S. PATENT DOCUMENTS 5,724,572 A * 3/1998 Dieffenderfer ............ G06F 7/74
5,931,940 A * 8/1999 Shelton ............... G06F 9/30018
   712/204
(Continued)

OTHER PUBLICATIONS

Canasai Kreungkrai, et al.: "A Parallell Learning Algorithm for Text Classification"; 2002; pp. 201-206.
(Continued)

*Primary Examiner* — Daniel H Pan
(74) *Attorney, Agent, or Firm* — Cantor Colburn LLP; Steven Chiu

(57) ABSTRACT

A parallel processing method, system, and/or computer program product for performing data parallel wide accesses on an unstructured text is provided. The parallel processing includes creating a pointer that points to a beginning of the unstructured text and loading into a vector register a string segment of the unstructured text based on the pointer. Then, access permissions of a first byte of the string segment are automatically tested. In turn, a determination is made as to whether the string segment includes an end indication, and a remaining portion of the unstructured text is validated by accessing and loading a last character identified by the end indication into the vector register when the string segment is determined to include the end indication.

3 Claims, 5 Drawing Sheets

(51) Int. Cl.

| | | |
|---|---|---|
| *G06F 17/22* | (2006.01) | |
| *G06F 17/27* | (2006.01) | |
| *G06F 11/00* | (2006.01) | |
| *G06F 16/30* | (2019.01) | |
| *G06F 21/62* | (2013.01) | |
| *G06F 16/31* | (2019.01) | |
| *G06F 12/14* | (2006.01) | |
| *G06F 11/36* | (2006.01) | |

(52) U.S. Cl.
CPC ...... *G06F 9/30036* (2013.01); *G06F 9/30043* (2013.01); *G06F 11/3648* (2013.01); *G06F 12/1416* (2013.01); *G06F 12/1458* (2013.01); *G06F 15/8053* (2013.01); *G06F 15/8076* (2013.01); *G06F 15/8084* (2013.01); *G06F 16/313* (2019.01); *G06F 17/2247* (2013.01); *G06F 2212/1052* (2013.01); *G06F 2221/2141* (2013.01); *G06F 2221/2145* (2013.01)

(58) Field of Classification Search
CPC .... G06F 16/316; G06F 16/381; G06F 16/382; G06F 16/383; G06F 16/387; G06F 16/38; G06F 17/2247; G06F 17/30569
USPC ........ 712/5, 6, 227, 300; 707/802, 803, 809, 707/811; 714/34, 35
See application file for complete search history.

(56) References Cited

U.S. PATENT DOCUMENTS

| | | | | |
|---|---|---|---|---|
| 6,047,283 A * | 4/2000 | Braun | ............... | G06F 17/30625 |
| 6,094,695 A * | 7/2000 | Kornher | ................. | G06F 5/065 |
| | | | | 710/56 |
| 7,181,725 B1 * | 2/2007 | Posegga | ............. | G06F 9/44589 |
| | | | | 714/E11.209 |
| 9,442,722 B2 * | 9/2016 | Bradury | ............. | G06F 9/30018 |
| 9,454,366 B2 * | 9/2016 | Bradbury | ............. | G06F 9/30018 |
| 9,454,367 B2 * | 9/2016 | Bradbury | ............. | G06F 9/30018 |
| 9,569,127 B2 * | 2/2017 | Gschwind | ............. | G06F 3/0622 |
| 9,703,721 B2 * | 7/2017 | Gschwind | ............. | G06F 12/1009 |
| 2010/0031007 A1 * | 2/2010 | Moudgill | ................. | G06F 7/02 |
| | | | | 712/220 |
| 2013/0091230 A1 * | 4/2013 | Dentamaro | ............. | H04L 67/06 |
| | | | | 709/206 |
| 2013/0243325 A1 * | 9/2013 | Bradbury | ................. | G06F 7/02 |
| | | | | 382/182 |
| 2013/0246699 A1 * | 9/2013 | Bradbury | ............ | G06F 9/30018 |
| | | | | 711/109 |
| 2013/0246739 A1 * | 9/2013 | Bradbury | ............ | G06F 9/30018 |
| | | | | 712/204 |
| 2013/0246757 A1 * | 9/2013 | Bradbury | ............ | G06F 9/30018 |
| | | | | 712/222 |
| 2013/0246759 A1 * | 9/2013 | Bradbury | ............ | G06F 9/30018 |
| | | | | 712/222 |
| 2016/0188496 A1 * | 6/2016 | Gschwind | ............. | G06F 3/0622 |
| | | | | 710/267 |

OTHER PUBLICATIONS

Daisy Zhe Wang, et al.: "Efficient In-Database Analytics with Graphical Models"; Sep. 2014; pp. 11.

F Bodin, et al.:, Implementing a Parallel C++ Runtime System for Scalable Parallel Systems; 1993; pp. 10.

Gerard Salton, et al.: "Parallel Text Search Methods"; Computing Practices; Feb. 1988; vol. 31, No. 2; pp. 14.

Heikki Hyyro, et al.: "On Bit-Parallel Processing of Multi-byte Text"; PRESTO, Japan Science and Technology Agency (JST); LNCS 3411; 2005; pp. 12.

K S M V Kumar, et al.; A Survey of Parallel Algorithms for Text Matching in Large Databases and Hardware Implementations; International Journal of Engineering and Innovative Technology (IJEIT)vol. 1, Issue 2, Feb. 2012; pp. 11.

Kuan-Ju Lin, et al.; "Efficient Parallel Knuth-Morris-Pratt Algorithm for Multi-GPUs with CUDA"; Advances in Intelligent Systems & Applications, SIST 21; 2013; pp. 1-10.

S. Wakabayashi et al:, "High Speed Text Retrieval"; IPCOM000060832D; Mar. 9, 2005; pp. 3.

* cited by examiner

```
strlen:      li        rEA_INDEX, 0
do_loop:     lxvxnf    vSRC, rSRC_PTR, rEA_INDEX
             vcmpnezb. vMASK, vSRC, vSRC
             bf        cr6.ALL_FALSE, EOS_found
             addi      rEA_INDEX, rEA_INDEX, 16
             b         do_loop EOC_found:   vclzlsbb  rINDEX, vMASK
             add       rRESULT, rINDEX, rEA_INDEX
             lbzx      rTEST, rSRC_PTR, rRESULT
             blr
```

FIG. 2

```
strcmp:
do_loop:    li         rEA_INDEX, 0
            lxvxnf     vSRC1, rSRC1_PTR, rEA_INDEX
            lxvxnf     vSRC2, rSRC2_PTR, rEA_INDEX
            vcmpnezb.  vMASK, vSRC1, vSRC2
            bf         cr6.ALL_FALSE, EOC_found
            addi       rEA_INDEX, rEA_INDEX, 16
            b          do_loop EOC_found:  vclzlsbb   rINDEX, vMASK
            vextublx   rSRC1, rINDEX, vSRC1
            vextublx   rSRC2, rINDEX, vSRC2
            subf       rRESULT, rSRC2, rSRC1
            add        rEOC_INDEX, rSRC_INDEX, rEOC_INDEX
            lbzx       rTEST, rSRC1_PTR, rEOC_INDEX
            lbzx       rTEST, rSRC2_PTR, rEOC_INDEX
            blr
```

FIG. 3

```
strcpy:
do_loop:    li          rEA_INDEX, 0
            lxvxnf      vSRC, rSRC_PTR, rEA_INDEX
            vcmpnezb.   vMASK, vSRC, vSRC
            bf          cr6.ALL_FALSE, EOS_found
            stxvx       vSRC, rDST_PTR, rEA_INDEX
            addi        rEA_INDEX, rEA_INDEX, 16
            b           do_loop
EOS_found:  vclzlsbb    rINDEX, vMASK
            addi        rLEN, rINDEX, 1
            addi        rTMP, rDST_INDEX, rEA_INDEX
            stxvl       vSRC, rTMP, rLEN
            lbzx        rTEST, rSRC_PTR, rINDEX
            blr
```

EXCEPTION PRESERVING PARALLEL DATA PROCESSING OF STRING AND UNSTRUCTURED TEXT

BACKGROUND

The present disclosure relates generally to data parallel processing of string and unstructured text, and more specifically, to exception preserving access to strings and unstructured text as a sequence of data parallel operation.

In general, contemporary parallel data processing systems that execute parallel vector operations to process strings require access to multiple bytes in memory concurrently. Yet, during this type of parallel data processing, using the vector memory access instructions implemented in these systems to load a string may exceed the string's termination character and, as a result may raise spurious exceptions if the memory access spans a protection boundary, which lead to processing termination. Further, contemporary data processing systems configured to avoid parallel accesses that span across protection boundaries have shown to produce excessively long routines that are not suitable for in-lining and have made short string operation performance suffer. Recent vector instruction set advancements have been implemented that permit software to speculatively load beyond the end of a string using a no-fault vector load instruction, realizing the performance advantage of using a high-bandwidth vector load instead of a low-bandwidth scalar load, such that if the memory access spans a protection boundary into a region of memory that does not exist. Instead of a protection violation exception, the no-fault vector load instruction returns a default value for any data in the memory access corresponding to that region of memory without raising a protection violation exception. The expectation is that the termination character of the string will be located prior to the protection boundary even though the vector load happens to load beyond the end of the string and even span a protection boundary. The default value returned is configured to allow processing to continue normally without providing any data to any region in memory that the program does not have permission to access. For example, for string processing, the default value could be configured as 0, corresponding to a string termination character. However, a problem is created with malformed strings (i.e., strings that erroneously are defined to span a protection boundary into a region that does not exist) with this solution, making a malformed strings to appear to the processing as a normally-terminated string, when normal string processing would have encountered the protection violation since the string terminating character would not have been encountered. Thus, the loss of a valuable software debug tool (i.e., detection of malformed strings and similar errant data) is the cost of accelerating string processing using data-parallel vector instructions.

SUMMARY

Embodiments include a method, system, and computer program product for performing data parallel wide accesses on an unstructured text. The method, system, and computer program product include: creating a pointer that points to a beginning of the unstructured text; loading into a vector register of the memory a string segment of the unstructured text based on the pointer; automatically testing access permissions of a first byte of the string segment; determining whether the string segment includes an end indication; and validating a remaining portion of the unstructured text by accessing and loading a last character identified by the end indication into the vector register when the string segment is determined to include the end indication.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 illustrates a code example executed by a parallel processing system in accordance with an embodiment of the present invention;

FIG. 3 illustrates another code example executed by a parallel processing system in accordance with an embodiment of the present invention;

FIG. 4 illustrates another code example executed by a parallel processing system in accordance with an embodiment of the present invention.

DETAILED DESCRIPTION

The present disclosure relates generally to data-parallel processing of strings and unstructured text, and more specifically, to exception preserving access to strings and unstructured text as a sequence of data parallel operation.

In view of the above, embodiments of the present invention disclosed herein may include parallel processing system, method, and/or computer program product (herein parallel processing system) that execute code to perform data-parallel processing of string and unstructured text. That is, the parallel processing system can be configured to perform data parallel accesses to text strings when the text/string structure is not known. Contemporary parallel data processing systems utilize functions to process a character at a time by checking for an end condition, processing the character, and proceeding to processing the next character. This sequential process by contemporary parallel data processing systems is inherently slow, but so far programmers have not been able to develop efficient data parallel processing for unstructured text strings because a data parallel access may have to touch protected memory, which causes an application to fail.

Figure 1:
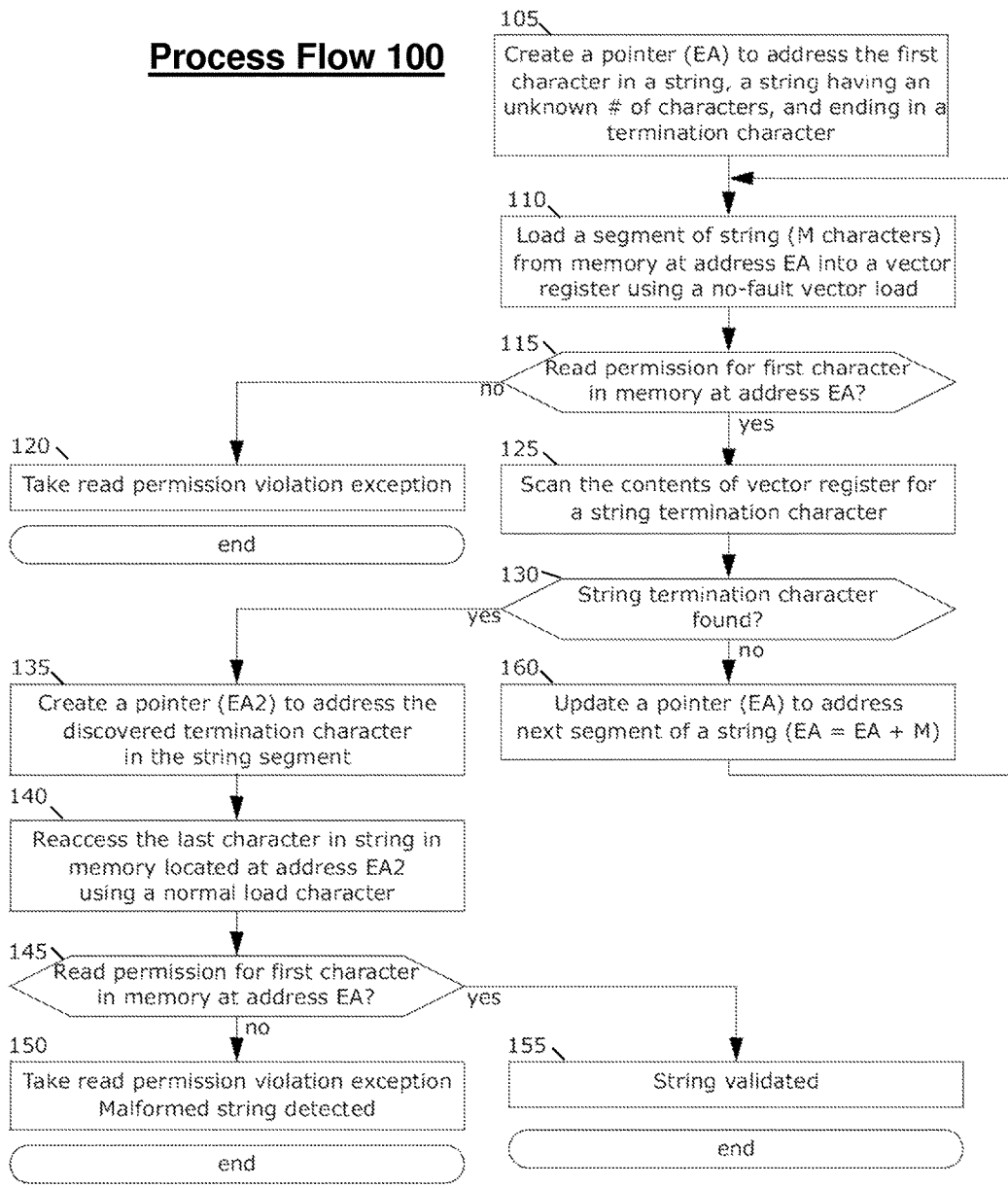
FIG. 1 illustrates a process flow of parallel processing system in accordance with an embodiment of the present invention.

In accordance with the disclosure, the parallel processing system processes unstructured text by performing data-parallel wide memory accesses on at least one unstructured text string as shown by FIG. 1, process flow 100. The process flow 100 begins at block 105 where a pointer to the beginning of an unstructured text string is created. For example, the pointer 'EA' is created to address a first character in a string, a string having an unknown number of characters, and ending in a termination character.

Then, at block 110, a segment of the string (e.g., M characters) is loaded into a vector register using a no-fault vector load instruction. The location of the string segment in memory is identified from the pointer (e.g., in this case at the beginning of the unstructured text string) and comprising 'n' characters, where n is the number of characters that can be stored in a vector register. The length of the unstructured text string is unknown, but can be determined by scanning the string until a string termination character is encountered. The length of the string can be less than n, can be equal to n, or can be greater than n. In the latter case, multiple string segments must be loaded in order to process the string, until a string termination character is encountered. When loading segment of the string using a no-fault vector load instruction, if less than n characters of the string are remaining to be loaded, the vector is either filled with the data accessed from memory after the end of the string for locations in memory having read permission, or with a default value for locations in memory that do not exist or do not have read permission. The default value can be an 'end-of-sequence' terminator.

Then, at decision block 115, access permissions are automatically tested by the no-fault vector load instruction for the memory being accessed. If the first character is not in a read-permitted location in memory, the process flow 100 takes the 'no' path to block 120. At block 120, a permission violation exception is taken and processing is terminated. Otherwise, the process flow 100 takes the 'yes' path to block 125.

At block 125, the contents of the vector register containing the string segment is scanned for a string termination character. At decision block 130, the process flow 100 determines whether the string segment includes an end indication (e.g., determining whether a string termination character is found).

If the string segment retrieved contains an end indication (i.e., the end of the unstructured text is reached), the process flow 100 proceeds to block 135, as indicated by the 'yes' path. At block 135, because a non-fault vector load can load a string termination character as the default value when the memory being accessed does not have read permission, or does not exist, it is unknown whether the string termination character was loaded as a valid part of the string or whether it was loaded as the default value due to a read permission violation. A pointer 'EA2' to the location in memory corresponding to the string termination character is created.

At block 140, the location in memory corresponding to the string termination character is loaded using a normal load that uses the pointer EA2 created in block 135. The normal load will check and honor the read access permission for the memory location being accessed.

At decision block 145, the process flow continues to block 150 if the normal load is not permitted to read the memory location at address EA2. This indicates that the string was a malformed string and that the string actually spanned a protection boundary without terminating. Further, this indicates that the string termination character was provided as a result of the no-fault vector load encountering a region in memory that does not exist, or does not have read permission and return the default value for that location.

Otherwise, at decision block 145, the process flow continues to block 155, indicating that a valid string termination character was encountered, validating the string just processed.

Returning to decision block 130, if a string termination character was not detected in the string segment loaded, then at least one more string segment needs to be processed and the process flow 100 continues on the 'no' path to block 160. At block 160, the pointer EA is incremented by M (i.e., the number of characters loaded by a vector load) to point to the next string segment.

If the string segment retrieved did not contain an end indication, the process flow 100 proceeds to block 160 as indicated by the NO arrow. At block 130, the pointer is updated to point to a next string segment (e.g., a remaining portion of the unstructured text). Then, the process flow 100 proceeds to repeat blocks 115, 120, and 125 with respect to the next string segment. Note that if a first character is validated in the string segment, then all m characters are validated up to the next string segment. In this way, the process flow 100 of the parallel processing system accesses strings as a sequence of data parallel operations and that can be in-lined with small code size.

In this way, the parallel processing system can search for an end of the unstructured text regardless of whether that unstructured text span across multiple pages of memory.

For instance, on a storage access that spans a boundary between two pages, "no-fault" loads return one or more null characters (i.e., null terminators or characters having the value 0) for strings on a portion of the storage access from a second of the two pages if that page is inaccessible. Contemporary systems utilize functions, such as string operations, to exploit these "no-fault" loads; however, these function never encounter a read permission exception since each string operation would terminate upon encountering the first terminating character (i.e., 0) returned by the "no-fault" load accessing the inaccessible page.

In addition, in the case of a malformed string (i.e., a string that runs to the end of the page without terminating and there is no next page mapped), when contemporary systems utilize normal loads, string processing would take the exception when crossing the page. In turn, when using "no-fault" loads to access the string, detection of such malformed strings would not be available since exceptions are not reported by the "no-fault" loads.

In contrast to the contemporary systems, the parallel processing system described here provides performance benefits of the "no-fault" load to speculatively load strings that span page boundaries and debug benefits of normal exception reporting when a malformed string is encountered.

For example, when using "no-fault" loads for string processing, the exception reporting encountered using normal loads can be reproduced by appending a normal load byte/character instruction (e.g., load instruction) upon terminating the string processing by detection of a null terminator.

The load instruction is configured to access a first terminating character that the parallel processing system detected, thus verifying the entire string was contained in accessible storage. The load instruction introduces minimal overhead to the overall string processing by utilizing only a single load byte instruction for each string being loaded Further, the load instruction is located in an epilogue code (e.g., outside of a main scan loop) and includes no dependency on the load other than translation lookaside buffer access (which improves virtual address translation speed) detecting a read permission exception.

Returning to the example, if there is an inaccessible page, the exception is reported. Thus, string processing by the parallel processing system receives the performance benefit of using "no-fault" loads as well as the debug benefits of detecting malformed strings.

The parallel processing system is also configured to avoid false exception suppression at the algorithmic level, e.g., by ensuring that if a base instruction where to have suffered an exception, an algorithm using the newly introduced facilities preserves such exceptions.

In operation, the parallel processing system can, when introducing a default initialization character and using a termination character as filler, convert a non-properly terminated string into a terminated string. Further, the parallel processing system can continue to operate an algorithm previously having raised an exception when accessing non-accessible memory after seemingly finding a string termination just at (or as a phantom terminator just after) a protection boundary. Yet, because it is desirable to terminate faulty programs, such that they may be debugged and rectified and rather than risking corruption of customer data, the parallel processing system can also unitize an indicator (e.g., a condition flag, condition register etc.). That is, when a memory access provides default values, the indicator can be set to allow address space introspection by the parallel processing system (e.g., even if it is not supported by the algorithm). In accordance with another embodiment of the parallel processing system, when an end indicator is reached, the end indicator can be expressly accessed. For string compare (e.g., a string compare code or 'strcmp' as described below) sequences, which in at least one implementation are required to return a difference of the two differing characters, this also corresponds to a natural implementation. In accordance with another embodiment of the parallel processing system, an access (such as load byte) can be inserted, and the access is not used.

An embodiment of a string compare code or 'strcmp' is as follows:

```
for (i=0; ; i+16)
    vector src1, src2;
    int mismatch;
    src1 = *(vector *) (address1+i);
    src2 = *(vector *) (address2+i);
    mismatch = pos_first_mismatch(src1,src2);
    if (mismatch < 16)
        return address1[i+mismatch] − address2[i+mismatch]
```

In the above code, the strings are assumed to be 16 characters long. Each string is compared for mismatches element by element (for each character of the 16 characters). When the 'strcmp' finds the mismatch, an address of that mismatch is returned. The address is the difference of the addresses of the two mismatched elements. Note that if the first string is less than the second string then a negative value is returned, while if the second string is less than the first string then a positive value is returned.

In accordance with another embodiment of the parallel processing system, an option to 'opt out' is provided. The opt out can be determined to be extremely unlikely for string to span a page boundary, can be further less likely that a string would be chopped off by an end of a page, and can reduce a likelihood that buggy code would manifest itself in other areas.

In view of the above, FIGS. 2-4, which illustrate code examples, will now be described. Note that in FIGS. 2-4, instructions are listed on a center column with the arguments for those instructions listed in the right most column. Instructions, such as lxvnf, stxvx, stxvl, vcmpnezb, vclzlsbb, vextublx, will now be described.

Load VSX Vector Indexed No-Fault instruction:

```
lxvxnf  XT,RA,RB
+---------+-------+-------+-------+-----+--+-------+--+
|   31    |   T   |  RA   |  RB   |  4  |1|  12   |TX|
|0        |6      |11     |16     |21   |25|26    |31|
+---------+-------+-------+-------+-----+--+-------+--+
```

RTL:

```
if TX=0 & MSR.VSX=0 then VSX_Unavailable( )
if TX=1 & MSR.VEC=0 then Vector_Unavailable( )
EA ← RA=0 ? GPR[RB] : GPR[RA] + GPR[RB]
VSR[32×TX+T] ← MEM(EA,16)
```

Let XT be the value 32×TX+T. Let the effective address (EA) be the sum of the contents of GPR[RA], or 0 if RA is equal to 0, and the contents of GPR[RB]. When Big-Endian byte ordering is employed, the contents of the quadword in storage at address EA are placed into VSR[XT] in such an order that: the contents of the byte in storage at address EA are placed into byte element 0 of VSR[XT], the contents of the byte in storage at address EA+1 are placed into byte element 1 of VSR[XT], and so forth until the contents of the byte in storage at address EA+15 are placed into byte element 15 of VSR[XT].

When Little-Endian byte ordering is employed, the contents of the quadword in storage at address EA are placed into VSR[XT] in such an order that: the contents of the byte in storage at address EA are placed into byte element 15 of VSR[XT], the contents of the byte in storage at address EA+1 are placed into byte element 14 of VSR[XT], and so forth until the contents of the byte in storage at address EA+15 are placed into byte element 0 of VSR[XT].

Read permission is required for the byte in memory at address EA. Any portion of the memory access that has read permission is placed into VSR[XT] as described above. Any subsequent portion of the memory access that does not exist or does not have read permission, a default value is placed into VSR[XT] as described above. Special Registers Altered: None.

Store VSX Vector Indexed Instruction:

```
stxvx  XS,RA,RB
+---------+-------+-------+-------+-----------------+--+
|   31    |   S   |  RA   |  RB   |       396       |SX|
|0        |6      |11     |16     |21               |31|
+---------+-------+-------+-------+-----------------+--+
```

RTL:

```
if SX=0 & MSR.VSX=0 then VSX_Unavailable( )
if SX=1 & MSR.VEC=0 then Vector_Unavailable( )
EA ← RA=0 ? GPR[RB] : GPR[RA] + GPR[RB]
MEM(EA,16) ← VSR[32×SX+S]
```

Let XS be the value 32×SX+S. Let the effective address (EA) be the sum of the contents of GPR[RA], or 0 if RA is equal to 0, and the contents of GPR[RB].

When Big-Endian byte ordering is employed, the contents of VSR[XS] are placed into the quadword in storage at address EA in such an order that: the contents of byte element 0 of VSR[XS] are placed into the byte in storage at address EA, the contents of byte element 1 of VSR[XS] are placed into the byte in storage at address EA+1, and so forth until the contents of byte element 15 of VSR[XS] are placed into the byte in storage at address EA+15.

When Little-Endian byte ordering is employed, the contents of VSR[XS] are placed into the quadword in storage at address EA in such an order that: the contents of byte element 15 of VSR[XS] are placed into the byte in storage at address EA, the contents of byte element 14 of VSR[XS]

are placed into the byte in storage at address EA+1, and so forth until the contents of byte element 0 of VSR[XS] are placed into the byte in storage at address EA+15. Special Registers Altered: None.

Store VSX Vector with Length Instruction:

```
stxvl  XS,RA,RB
+---------+-------+-------+-------+-----------------+--+
|   31    |   S   |  RA   |  RB   |       397       |SX|
|0        |6      |11     |16     |21               |31|
+---------+-------+-------+-------+-----------------+--+
```

RTL:

```
if TX=0 & MSR.VSX=0 then VSX_Unavailable( )
if TX=1 & MSR.VEC=0 then Vector_Unavailable( )
EA ← (RA=0) ? 0 : GPR[RA]
nb ← Clamp(EXTZ(GPR[RB].bit[0:7]), 0, 16)
if MSR.LE = 0 then        // Big-Endian byte-ordering
    store_data ← VSR[32×SX+S].byte[0:nb−1]
else                      // Little-Endian byte ordering
    store_data ← VSR[32×SX+S].byte[16-nb:15]
MEM(EA,nb) ← store_data
```

Let XT be the value 32×SX+S. Let the effective address (EA) be the contents of GPR[RA], or 0 if RA is equal to 0. Let nb be the unsigned integer value in bits 0:7 of GPR[RB].

If nb is equal to 0, the storage access is not performed. Otherwise, when Big-Endian byte-ordering is employed, do the following.

If nb less than 16, the contents of the leftmost nb bytes of VSR[XS] are placed in storage starting at address EA. Otherwise, the contents of VSR[XS] are placed into the quadword in storage at address EA. Otherwise, when Little-Endian byte ordering is employed, do the following.

If nb less than 16, the contents of the rightmost nb bytes of VSR[XS] are placed in storage starting at address EA in byte-reversed order. Otherwise, the contents of VSR[XS] are placed into the quadword in storage at address EA in byte-reversed order.

If the contents of bits 8:63 of GPR[RB] are not equal to 0, the results are boundedly undefined. Special Registers Altered: None.

Vector Compare not Equal or Zero Byte:

```
vcmpnezb   VRT,VRA,VRB  (if Rc = 0)
vcmpnezb.  VRT,VRA,VRB  (if Rc = 1)

+---------+-------+-------+-------+---+-----------------+
|    4    |  VRT  |  VRA  |  VRB  |RC |       263       |
|0        |6      |11     |16     |21 |22             31|
+---------+-------+-------+-------+---+-----------------+
```

RTL:

```
if MSR.VEC=0 then Vector_Unavailable( )
do i = 0 to 15
    src1 ← VR[VRA].byte[i]
    src2 ← VR[VRB].byte[i]
    if (src1 = 0) | (src2 = 0) | (src1 != src2) then
        VR[VRT].byte[i] ← 0xFF
    else
        VR[VRT].byte[i] ← 0x00
end
all_true ← (VR[VRT]=0xFFFF_FFFF_FFFF_FFFF_FFF_FFFF_FFFF_FFFF)
all_false ← (VR[VRT]=0x0000_0000_0000_0000_0000_0000_0000_0000)
if Rc=1 then CR.bit[56:59] ← (all_true<<3) + (all_false<<1)
```

For each integer value i from 0 to 15, do the following. The integer value in byte element i in VR[VRA] is compared to the integer value in byte element i in VR[VRB]. The contents of byte element i in VR[VRT] are set to 0xFF if integer value in byte element i in VR[VRA] is not equal to the integer value in byte element i in VR[VRB] or either value is equal to 0x00, and are set to 0x00 otherwise.

If Rc=1, CR field 6 is set to indicate whether all vector elements compared true and whether all vector elements compared false. Special Registers Altered: CR field 6 (if Rc=1).

Vector Count Leading Zero Least-Significant Bits Byte:

```
vclzlsbb  RT,VRB

+---------+-------+-------+-------+----------------------+
|    4    |  RT   |   0   |  VRB  |         1538         |
|0        |6      |11     |16     |21                  31|
+---------+-------+-------+-------+----------------------+
```

RTL:

```
if MSR.VEC=0 then Vector_Unavailable( )
count = 0
do while count < 16
    if (VR[VRB].byte[count].bit[7]=1) break
    count ← count + 1
end
GPR[RT] ← EXTZ64(count)
```

Let count be the number of contiguous leading byte elements in VR[VRB] having a zero least-significant bit. Count is placed into GPR[RT]. Special Registers Altered: None.

Vector Extract Unsigned Byte Left-Indexed:

```
vextublx  RT,RA,VRB

+---------+-------+-------+--------+----------------------+
|    4    |  RT   |  RA   |  VRB   |         1549         |
|0        |6      |11     |16      |21                  31|
+---------+-------+-------+--------+----------------------+
```

RTL:

```
if MSR.VEC=0 then Vector_Unavailable( )
index ← GPR[RA].bit[60:63]
GPR[RT] ← EXTZ64(VR[VRB].byte[index])
```

Let index be the contents of bits 60:63 of GPR[RA]. The contents of byte element index of VR[VRB] are placed into bits 56:63 of GPR[RT]. The contents of bits 0:55 of GPR [RT] are set to 0. Special Registers Altered: None.

FIG. 2 illustrates a code example executed by a parallel processing system in accordance with an embodiment of the present invention. The code example of FIG. 2 is a string length code or 'strlen' that searches for the end of a string. In operation, the 'strlen' sets the rEA_INDEX to 0 by performing a load immediate function (e.g., 'li'). Then, the 'strlen' enters a loop (e.g., 'do_loop').

Upon entering the 'do_loop,' the 'strlen' loads the no-fault (e.g., load vector no-fault load function or 'lxvxnf'). In this example, two bytes are loaded into two vector registers ('vSRC' and 'vSRC') based on a pointer (the 'rSRC_PRT') that provides a base address of the string and adds the 'rEA_INDEX.' When the 'rSRC_PRT' is pointing to the beginning of the string, a first 16 bits of the string are loaded into the vector registers (e.g., first and second vector registers). Then, the 'strlen' performs a vector compare of not equal or zero function (e.g., 'vcmpnezb').

During the 'strlen', the 'vcmpnezb' compares each element of a first vector register to each corresponding element of the second vector register to determine whether these elements are not equal or whether any element is equal to zero. Note that the first and second vector registers are the same vector register, making the compare If all of the elements are equal, then the ALL_FALSE summary status bit in a condition register field 6 (e.g., 'cr6') will be set to 1 or true. Otherwise, the ALL_FALSE bit will be set to 0 or false. If ALL_FALSE is true, then the 'strlen' loads another 16 bits by performing an add immediate function (e.g., 'addi'), where the 'rSRC_INDEX' is a target register, the 'rEA_INDEX' is a source register, and 16 is an immediate value. Next, the 'strlen' performs a branch (e.g., 'b') to the 'do_loop' to continue the loop.

If ALL_FALSE is false (e.g., 'cr6.ALL_FALSE') then the 'strlen' performs a branch false function (e.g., bf) to 'EOS_found.' In 'EOS_found,' the 'strlen' first computes the length of the string using a count and a least significant bit instruction (e.g., vector count leading zero least significant bit by byte function or 'vclzlsbb'). In general, 'vclzlsbb' scans across all vector to count the number of zero vector bytes. Then, the count is moved to a general purpose register so that an actual count of characters is determined. Next, a load byte (e.g., 'lbzx') is performed from the last character position, which is a null terminating character, and returns back. If the null terminating character is returned, then the 'strlen' has identified that there was no exception for the no-fault load. If there is read access, because the string spanned across a page boundary, the page fault would be taken on that load.

In view of FIG. 2, FIG. 3 illustrates another code example executed by a parallel processing system in accordance with an embodiment of the present invention. The code example of FIG. 3 is a string compare code or 'strcmp,' using instructions defined in the Power ISA Architecture. Two strings are compared, returning a negative integer value if the first string compares less than the second string, returning a 0 if the first string compares equal to the second string, and returning a positive integer value if the first string compares greater than the second string. Also in view of FIG. 2, FIG. 4 illustrates another code example executed by a parallel processing system in accordance with an embodiment of the present invention. The code example of FIG. 4 is a string copy code or 'strcpy.' A source string is copied to another location in memory using instructions defined in the Power ISA Architecture.

Figure 5:
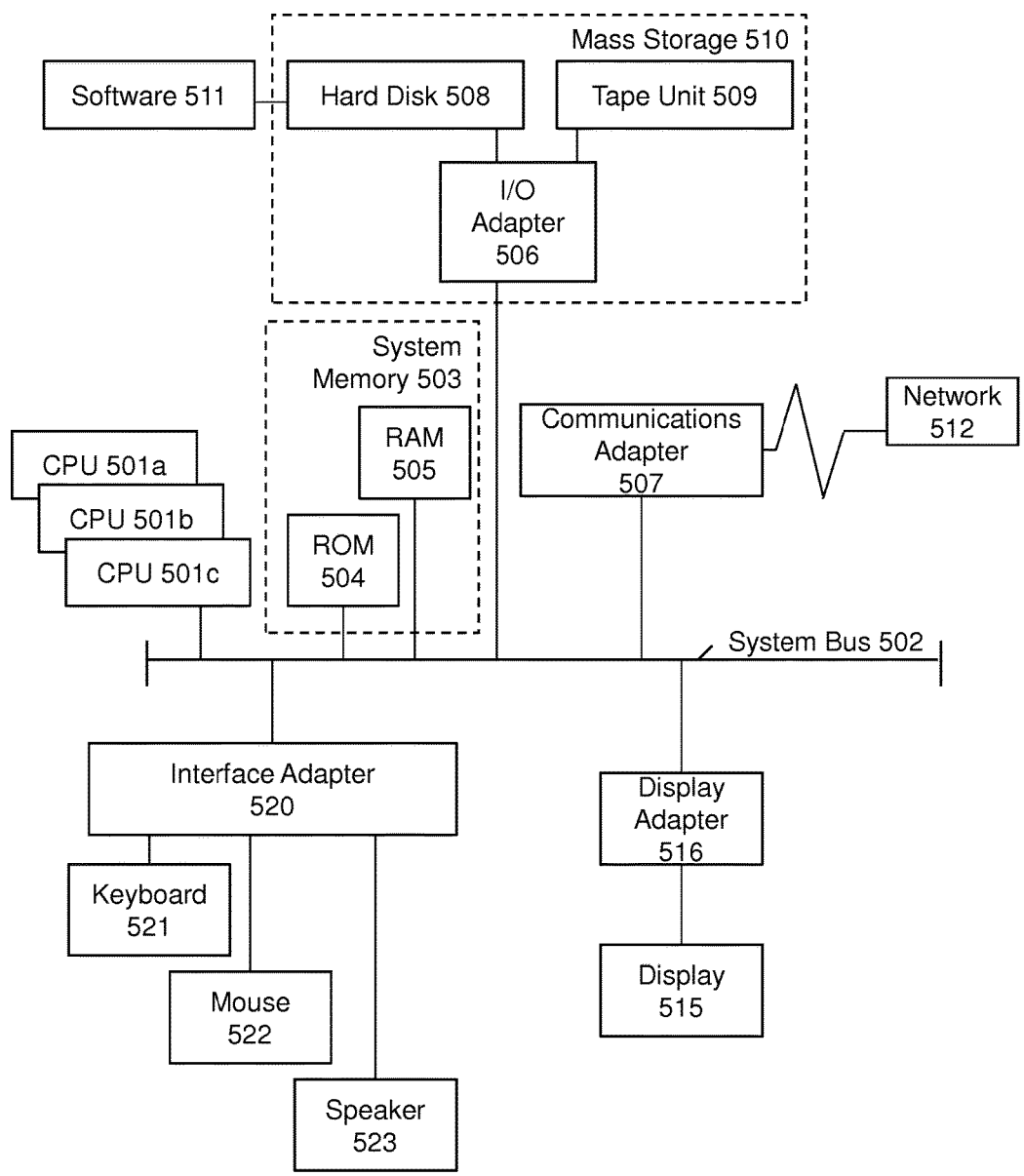
FIG. 5 illustrates a processing system in accordance with an embodiment of the present invention.

Referring now to FIG. 5, there is shown an embodiment of a processing system 500 for implementing the teachings herein. In this embodiment, the processing system 500 has one or more central processing units (processors) 501a, 501b, 501c, etc. (collectively or generically referred to as processor(s) 501). The processors 501, also referred to as processing circuits, are coupled via a system bus 502 to system memory 503 and various other components. The system memory 503 can include read only memory (ROM) 504 and random access memory (RAM) 505. The ROM 504 is coupled to system bus 502 and may include a basic input/output system (BIOS), which controls certain basic functions of the processing system 500. RAM is read-write memory coupled to system bus 502 for use by processors 501.

FIG. 5 further depicts an input/output (I/O) adapter 506 and a network adapter 507 coupled to the system bus 502. I/O adapter 506 may be a small computer system interface (SCSI) adapter that communicates with a hard disk 508 and/or tape storage drive 509 or any other similar component. I/O adapter 506, hard disk 508, and tape storage drive 509 are collectively referred to herein as mass storage 510. Software 511 for execution on processing system 500 may be stored in mass storage 510. The mass storage 510 is an example of a tangible storage medium readable by the processors 501, where the software 511 is stored as instructions for execution by the processors 501 to perform a method, such as the process flows of FIG. 1 and code examples of FIGS. 2-4. Network adapter 507 interconnects system bus 502 with an outside network 512 enabling processing system 500 to communicate with other such systems. A screen (e.g., a display monitor) 515 is connected to system bus 502 by display adapter 516, which may include a graphics controller to improve the performance of graphics intensive applications and a video controller. In one embodiment, adapters 506, 507, and 516 may be connected to one or more I/O buses that are connected to system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 502 via an interface adapter 520 and the display adapter 516. A keyboard 521, mouse 522, and speaker 523 can be interconnected to system bus 502 via interface adapter 520, which may include, for example, a Super I/O chip integrating multiple device adapters into a single integrated circuit.

Thus, as configured in FIG. 5, processing system 505 includes processing capability in the form of processors 501, and, storage capability including system memory 503 and mass storage 510, input means such as keyboard 521 and mouse 522, and output capability including speaker 523 and display 515. In one embodiment, a portion of system memory 503 and mass storage 510 collectively store an operating system, such as the z/OS or AIX operating system from IBM Corporation, to coordinate the functions of the various components shown in FIG. 5.

Technical effects and benefits the ability to perform data parallel accesses to text strings when the text/string structure is not known. Thus, embodiments described herein are necessarily rooted in processor to perform proactive operations to overcome problems specifically arising in the realm of data parallel processing of string and unstructured text (e.g., these problems include the inherently slow sequential processing). For example, while contemporary systems are non-optimal, the load instruction introduces minimal overhead to the overall string processing by utilizing only a single load byte instruction for each string being loaded.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of performing, by a processor coupled to a memory, parallel data wide accesses on an unstructured text, comprising:
   creating, by the processor, a plurality of separate string index pointers, each separate string index pointer pointing at a beginning of a plurality of string segments of the unstructured text;
   loading into a vector register of the memory, by the processor using a no-fault vector load instruction, the plurality of separate string segments of the unstructured text based on the plurality of separate string index pointers;
   automatically testing, by the processor, access permissions of a first byte of each separate string segment of the plurality of separate string segments;
   determining, by the processor, whether one of the plurality of separate string segments includes an end indication;
   updating, by the processor, a corresponding pointer of the plurality of separate string index pointers to point to a next string segment of the plurality of separate string segments when one of the plurality of separate string segments is determined to not include the end indication;
   validating, by the processor, a remaining portion of the unstructured text by accessing and loading a last character position identified by the end indication into the vector register when the one of the plurality of separate string segments is determined to include the end indication, the last character position comprising a null terminating character;
   appending a load instruction to the last character position verifying that the one of the plurality of separate string segments was contained in accessible storage;
   loading into the vector register of the memory the next string segment of the unstructured text based on the corresponding pointer, the vector register holding or storing at least 'm' characters from the unstructured text, wherein if less than 'm' characters are available, the vector register is filled with a default value, wherein when the default value is encountered, processing continues without providing any data to any region in memory that a program does not have permission to access; and
   automatically testing access permissions of a first byte of the next string segment, where
   if the first byte is not in a read-permitted location in the memory, a permission violation exception is taken and processing is terminated, and
   if the first byte is in the read-permitted location in the memory, contents of the vector register containing the next string segment are scanned for a string termination character and a determination is made as to whether the next string segment includes the end indication.

2. A computer program product, the computer program product comprising a computer readable storage medium having program instructions for performing parallel data wide accesses on an unstructured text embodied therewith, the program instructions executable by a processor coupled to a memory to cause the processor to perform:
   creating a plurality of separate string index pointers, each separate string index pointer pointing at a beginning of a plurality of string segments of the unstructured text;
   loading into a vector register of the memory using a no-fault vector load instruction, the plurality of separate string segments of the unstructured text based on the plurality of separate string index pointers;
   automatically testing access permissions of a first byte of each separate string segment of the plurality of separate string segments;
   determining whether one of the plurality of separate string segments includes an end indication;
   updating a corresponding pointer of the plurality of separate string index pointers to point to a next string segment of the plurality of separate string segments when one of the plurality of separate string segments is determined to not include the end indication;
   validating a remaining portion of the unstructured text by accessing and loading a last character position identified by the end indication into the vector register when the one of the plurality of separate string segments is determined to include the end indication, the last character position comprising a null terminating character;
   appending a load instruction to the last character position verifying that the one of the plurality of separate string segments was contained in accessible storage;
   loading into the vector register of the memory the next string segment of the unstructured text based on the corresponding pointer, the vector register holding or storing at least 'm' characters from the unstructured text, wherein if less than 'm' characters are available, the vector register is filled with a default value, wherein when the default value is encountered, processing continues without providing any data to any region in memory that a program does not have permission to access; and
   automatically testing access permissions of a first byte of the next string segment, where
   if the first byte is not in a read-permitted location in the memory, a permission violation exception is taken and processing is terminated, and
   if the first byte is in the read-permitted location in the memory, contents of the vector register containing the next string segment are scanned for a string termination character and a determination is made as to whether the next string segment includes the end indication.

3. A system, comprising a processor and a memory storing program instructions for performing parallel data wide accesses on an unstructured text thereon, the program instructions executable by a processor to cause the system to perform:
   creating a plurality of separate string index pointers, each separate string index pointer pointing at a beginning of a plurality of string segments of the unstructured text;
   loading into a vector register of the memory using a no-fault vector load instruction, the plurality of separate string segments of the unstructured text based on the plurality of separate string index pointers;

automatically testing access permissions of a first byte of each separate string segment of the plurality of separate string segments;

determining whether one of the plurality of separate string segments includes an end indication;

updating a corresponding pointer of the plurality of separate string index pointers to point to a next string segment of the plurality of separate string segments when one of the plurality of separate string segments is determined to not include the end indication;

validating a remaining portion of the unstructured text by accessing and loading a last character position identified by the end indication into the vector register when the one of the plurality of separate string segments is determined to include the end indication, the last character position comprising a null terminating character;

appending a load instruction to the last character position verifying that the one of the plurality of separate string segments was contained in accessible storage;

loading into the vector register of the memory the next string segment of the unstructured text based on the corresponding pointer, the vector register holding or storing at least 'm' characters from the unstructured text, wherein if less than 'm' characters are available, the vector register is filled with a default value, wherein when the default value is encountered, processing continues without providing any data to any region in memory that a program does not have permission to access; and automatically testing access permissions of a first byte of the next string segment, where if the first byte is not in a read-permitted location in the memory, a permission violation exception is taken and processing is terminated, and if the first byte is in the read-permitted location in the memory, contents of the vector register containing the next string segment are scanned for a string termination character and a determination is made as to whether the next string segment includes the end indication.

* * * * *